Patented Jan. 30, 1934

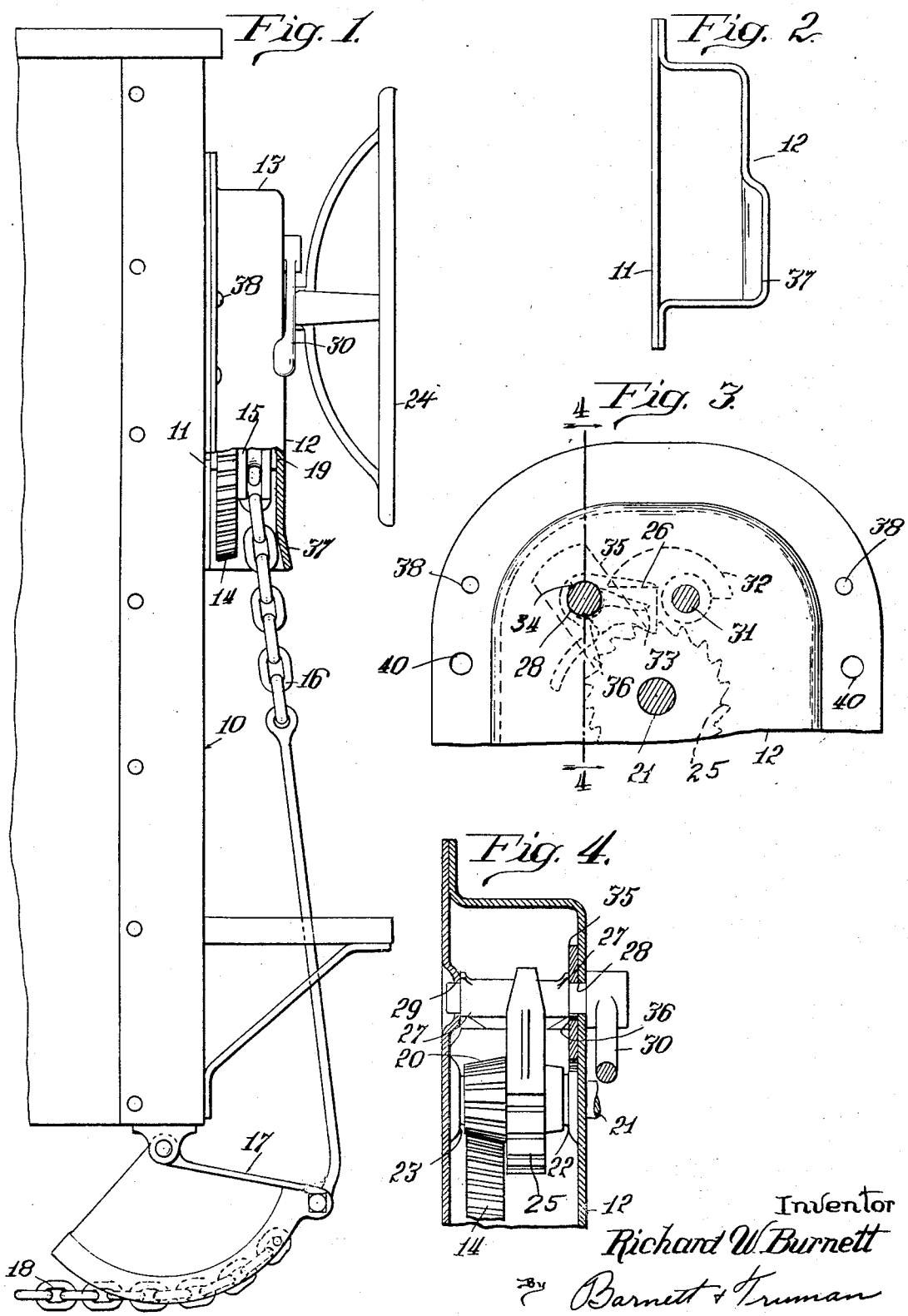

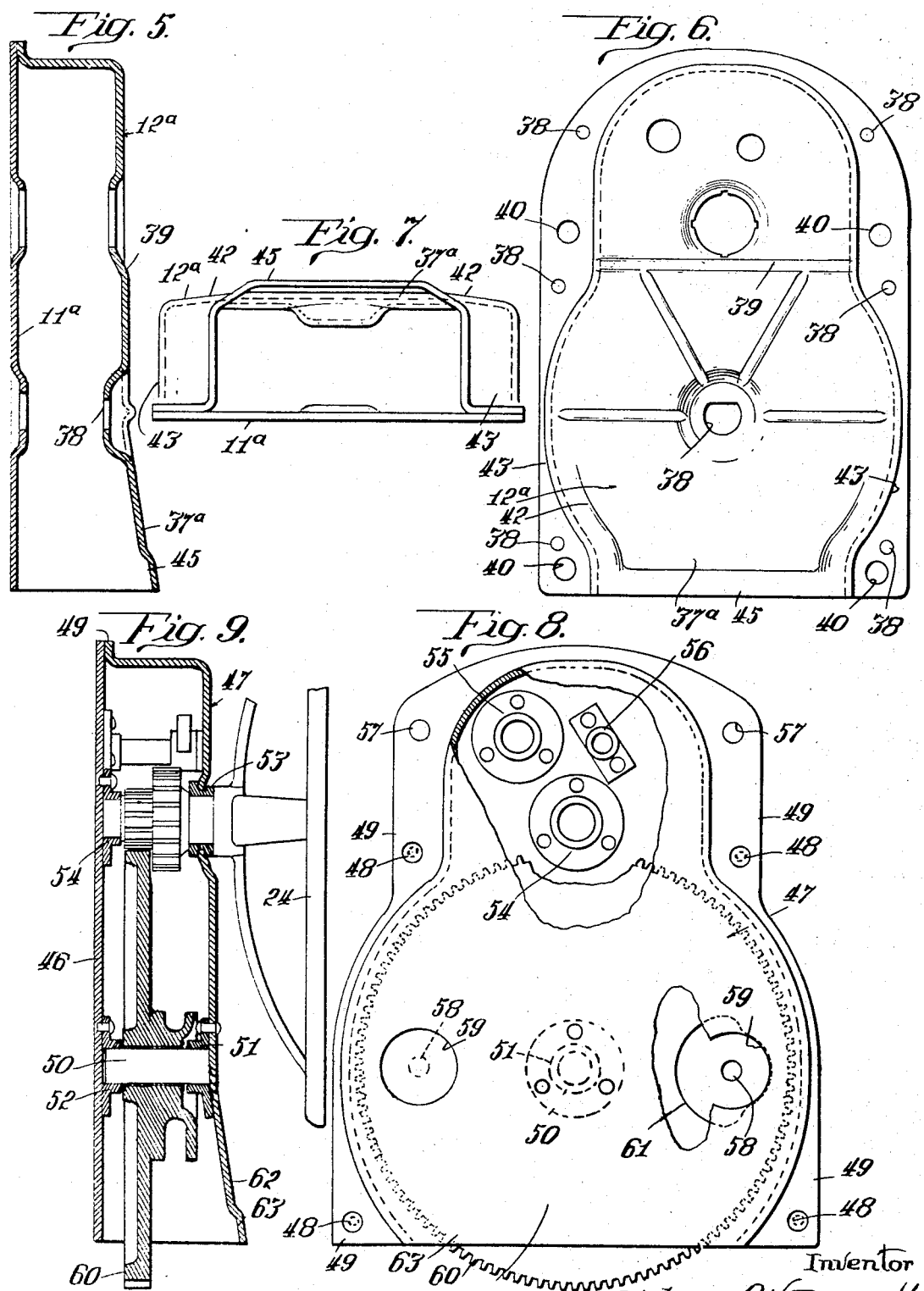

1,945,363

UNITED STATES PATENT OFFICE 1,945,363

HOUSING FOR RAILWAY CAR HAND BRAKE MECHANISM

Richard W. Burnett, Chicago, Ill.

Application May 20, 1933. Serial No. 672,001

10 Claims. (Cl. 254—1)

My invention relates to housings for enclosing and supporting, in their proper position, the operating parts of railway car hand brakes and particularly for enclosing and supporting the winding mechanism and the holding and releasing mechanism of hand brakes of the general type shown in my copending application Serial No. 349,817, filed March 25, 1929, which is now Patent No. 1,911,056, dated May 23, 1933, of which the present application is a continuation in part.

Hand brakes of the character to which the present invention appertains are designed to develop relatively high power during the brake setting operation, and are ordinarily installed on railway cars at locations which, because of the standard clearance requirements for such cars, make it desirable to form the housing relatively thin so as to not project an objectionable distance outwardly from the car walls on which they are mounted and also maintain the minimum requirement of four inches between the housing and the rim of the hand wheel. Such conditions not only require that the operating parts have a compact arrangement within the housing, but also place indirect limitations on the size and consequently the strength of the brake chains and other operating parts of the hand power mechanism.

The general object of the present invention is to provide an improved housing for hand brake winding mechanism which is so formed that the brake chain and other operating parts of the winding mechanism may be made larger than the corresponding elements now in general use, without involving any substantial increase in the overall thickness of the housing and which, at the same time, will provide the necessary strength and rigidity to withstand the wear and strains imposed on such housing during the brake setting and brake releasing operations.

A more specific object of the invention is to provide a housing, the lower portion of which is so formed as to provide ample clearance between the brake chain and the front wall of the housing to permit the chain to swing a substantial distance outwardly from the vertical center of the winding drum without coming into rubbing engagement with the lower end of the housing. Such swinging of the chain is present when its lower end is connected to a bellcrank which swings outwardly relative to the center of the winding drum or when the mounting of the winding mechanism on the car is such as to require the chain to assume an angular position relative to the vertical plane of said drum.

Another specific object is to provide a suitable and inexpensive reinforcement for the bearing openings in the housing which receive the thrusts and pressures exerted through the holding pawls.

The housings heretofore used have ordinarily provided uniform spacing of the holes for receiving the bolts or rivets for attaching the housings to the car walls, whereby various housings may be interchangeably mounted on a car without requiring additional holes to be drilled in the car walls. It is a specific object of the present invention to provide a housing of greater width than the housings heretofore used and to provide the same with novel constructions whereby the usual spacing of the bolt openings may be employed for interchangeably mounting the housing on cars regardless of the width of the housing or the diameter of the drum gear enclosed therein.

The invention is illustrated in certain preferred embodiments in the accompanying drawings, wherein:

Fig. 1 is a side view of a hand brake winding mechanism with parts of the housing shown in section to illustrate the outwardly flared portion at the lower end of the housing.

Fig. 2 is a view of the open lower end of the housing shown in Fig. 1.

Fig. 3 is a fragmentary view in elevation, of the upper portion of the housing shown in Fig. 1 and illustrating means for providing wide bearings for the shaft of the holding pawl.

Fig. 4 is a vertical section taken on line 4—4 of Fig. 3.

Fig. 5 is a vertical section taken through a housing to illustrate the outwardly flared portion of the housing adjacent the lower end thereof.

Fig. 6 is a face view of the housing construction shown in Fig. 5.

Fig. 7 is a view of the open lower end of the housing shown in Figs. 5 and 6.

Fig. 8 is a front view of another modification, and

Fig. 9 is a vertical section of the housing construction shown in Fig. 8.

For the purpose of illustrating certain advantages of the invention, one embodiment thereof is shown in Figs 1 to 4, inclusive, in connection with the hand brake winding mechanism. The housing encloses certain parts of the winding mechanism and is adapted to be mounted in a vertical position on a railway car, for example, the end wall 10. It consists of two, preferably, pressed metal parts, namely a back plate 11 which provides a wide bearing surface against the car wall and a front member 12. The front member is dished outwardly, as indicated by the reference character 13, to provide a compartment for certain of the operating parts of the winding mechanism. The mechanism enclosed in the housing comprises a large gear 14 and a winding drum 15. The said drum is formed with a grooved winding surface for a chain 16, the latter of which is adapted to wind upon the drum in a single plane. The lower end of the chain is attached to a rocking member 17 adapted to transmit vertical pulls on the chain 16 to horizontal pulls on a chain 18 located beneath the car. The winding drum 15 is preferably made integral with the large gear 14 and rotates about a shaft 19 supported by the front and back walls of the housing. The large gear meshes with a pinion 20 formed on a shaft 21 which is mounted in suitable openings 22—23 in the front and back walls, respectively, of the housing. One end of the shaft 21 extends out of the housing and is provided with a hand wheel 24 by which rotation is imparted to the enclosed gearing and winding drum.

The winding drum is held against reverse movement and in brake setting position by means of the ratchet wheel 25 formed on the hand wheel shaft 21, and a holding pawl 26 engaged with the ratchet. The holding pawl is provided with trunions 27 supported in bearing openings 28—29 in the front and back walls, respectively, of the housing. A releasing lever 30 is secured to a shaft 31 journaled in suitable bearings in the housing. The shaft 31 is provided with a cam 32 which in one position of the lever bears upon the upper portion of the holding pawl to hold it in engagement with the ratchet and in another position engages under a projecting portion 33 of the pawl to raise it out of engagement with the ratchet teeth and thereby permit reverse movement of the ratchet wheel, gearing and winding drum.

When it is desired to effect a partial release only or a step by step release of the brakes, the holding pawl 26 is permitted to reengage with the ratchet wheel to interrupt the releasing movement of the winding mechanism. Upon reengagement of the pawl 26 with the teeth of the ratchet wheel during the reverse movement of the ratchet, the bearing opening 28 is subjected to a severe thrust at approximately the point indicated by the reference character 34. This portion of the bearing opening also receives the constant pressure when the brakes are held in fully set position. In order to provide a relatively wide bearing surface for the pawl trunion 27 at the point where the said thrust and holding pressures are transmitted to the bearing opening 28, a plate 35 having an opening 36 therein slightly larger than the opening 28 is suitably secured, for example, by spot welding, to the inner face of the outer wall of the housing. The said plate 35 is arranged on the inner face of the housing so that the edges of the openings 28 and 36 will be in alignment at the point where the thrust is transmitted to the housing. By making the opening 36 in the plate 35 somewhat larger than the opening 28, the plate can be shifted to provide the desired alignment of the openings at the point 34 and thereby provide the desired wide bearing at the point of thrust, without necessitating reamings of the bearing openings.

In some installations, for example, installations on hopper cars and gondola cars, the winding mechanism is so positioned with relation to the bellcrank or other means employed for changing the direction of the brake chain, that the vertical portion of said chain assumes a pronounced angular position relative to the vertical plane of the winding drum, for example, when the bellcrank 17 moves to the position indicated in Fig. 1. In order to provide sufficient clearance between the chain and housing to permit such outward swinging movements of a large chain and at the same time avoid any substantial increase in the overall thickness of the housing, the front wall of the housing is formed along the bottom edge at one side thereof with an outwardly flared portion 37. This construction, in addition to providing the desired clearance between the chain and housing to prevent the chain from rubbing against the lower edge thereof, serves also as a rigidifying flange which reinforces the front wall and corner portions of the housing adjacent its open end.

The modified housing construction shown in Figs. 5, 6 and 7 consists of a backplate 11a and an outwardly dished front member 12a provided with attaching flanges which are secured to the marginal portion of the back plate by means of small rivets 38. The lower portion of the outwardly pressed part of the front member is made somewhat wider than the upper portion thereof so as to conform generally to the large gear adapted to be mounted in the lower part of the housing. This portion of the housing is also offset outwardly relative to the upper portion thereof, as indicated by the reference numeral 39. This housing is adapted to be applied to the wall of a car by means of mounting bolts or rivets which are inserted through the openings 40 in the attaching flange portion of the housing. The outwardly flared portion 37a preferably extends entirely across the front wall of the housing and also extends upwardly to approximately the horizontal center of the bearing opening 38 for receiving the winding drum shaft. The outwardly flared portions 37a, adjacent the side walls of the housing, are inclined outwardly, as indicated by the reference numerals 42—42 in Fig. 6, and merge into the outwardly curved side walls 43—43 of the housing. Additional clearance for the chain is provided at the lower edge of the housing by offsetting the said lower edge of the front wall in a manner indicated by the reference character 45, thereby providing additional reinforcement which extends across the front wall of the housing adjacent the lower open end thereof.

The housing illustrated in Figs. 8 and 9 is of the same general contour as that shown in Figs. 5, 6 and 7, but is somewhat longer and the lower portion is considerably wider than the housings previously described so as to accommodate a drum gear of larger diameter. In this embodiment the back plate 46 and the dished front member 47 are secured together by means of rivets 48 which pass through the flanges 49 of the front member. The drum shaft 50, instead of being fitted, as previously shown, into openings in the front and back walls of the housing is supported in flanged bearings 51 and 52 riveted to the front and back walls of the housing. The bearings for the hand wheel shaft consist of a bearing member 53 fitted into an opening in the front wall of the housing and a flanged member 54 secured to the rear wall 46 of the housing. Similar bearing members 55 and 56 for the holding pawl and the tripping cam shaft are likewise secured to the front and back walls of the housing. When the housing is made of cast material, these various bearings, instead of being made in separate parts, may be cast integrally with the front and back members of the housing. With either construction the portion of the back wall defined by the dished portion of the front member will be imperforate insofar as bearing openings are concerned and thereby prevent the entrance of water or other foreign matter likely to corrode or otherwise attack the bearing surface of the operating parts enclosed in the housing. The holes for receiving the mounting bolts or rivets are designated by the reference numerals 57 and 58 and are preferably provided with the same spacing arrangement as the holes 40 illsutrated in Fig. 5 so that the larger and smaller housings may be interchangeably mounted on a railway car without requiring additional holes to be drilled in the car wall. The upper mounting holes 57 of the present embodiment are formed in the attaching flanges of the housing, but the lower mounting rivet holes 58 are formed only in the back plate of the housing. In order to facilitate applying the housing to a car wall, the front wall of the housing is formed with large openings 59—59 and the large drum gear 60 is provided with one or more openings 61 adapted to be moved into a position relative to the openings 59—59 to permit a suitable upsetting tool to be inserted through the outer wall of the housing and said gear to upset the end of the mounting rivet in the said holes 58—58. The lower portion of the front wall of the housing is flared outwardly, as indicated at 62, and the lower edge thereof is provided with an offset 63. The outwardly flared portion 62 and the said offset portion 63 may be and preferably are of the same construction as illustrated in Figs. 5, 6 and 7.

It will be seen that a housing made in accordance with the present embodiment will accommodate winding mechanisms capable of developing considerably more power than the winding mechanism previously described herein and at the same time make it practicable to maintain a minimum overall thickness of the housing which will permit it to be applied to the end walls of railway cars without violating the clearance requirements imposed on such installations. The gear 60 being of larger diameter than the gears heretofore used, moves the center of the winding drum downwardly relative to the rim of the vertically disposed hand wheel. This permits the front wall 47 to be flared outwardly a greater distance than in the shorter housings without violating the clearance requirement of four inches between the rim of the hand wheel and any part of the housing. The outer plane of the hand wheel must also be confined within fixed clearance limits. It must not project beyond a vertical plane located four inches back of the inner face of the coupler knuckle when said knuckle is closed and the coupler horn is against the buffer block or the end sill of the car.

I claim:

1. A housing for hand brake winding mechanism comprising a back plate and an outwardly dished front member which together enclose and support in a vertical position on a car the gearing and winding drum of said mechanism and the upper portion of a brake chain, the said housing being closed at the top and sides but open at the bottom and the lower portion of the front wall being flared outwardly to rigidify the housing adjacent the open end thereof and to provide clearance for said chain.

2. A housing for hand brake winding mechanism comprising a back plate and an outwardly dished front member which together enclose and support in a vertical position on a car the gearing and winding drum of said mechanism and the upper portion of a chain adapted to wind on said drum, the said housing being closed at the top and sides, but open at the bottom and the lower portion of the front wall of the housing being flared outwardly to rigidify the housing adjacent the said open end and to provide clearance for said chain when the latter assumes an angular position relative to the side plane of the winding drum.

3. A housing for hand brake winding mechanism comprising back and front members, one of said members being dished to form a chamber for enclosing the gearing and winding drum of said mechanism and a portion of the brake chain which winds on said drum, the said dished portion being closed at the top and sides but open at the bottom and the lower portion of the front wall of the housing being flared outwardly to provide a rigidifying portion which extends across the housing adjacent the open end thereof and to also provide clearance for said chain.

4. A housing for hand brake winding mechanism comprising back and front members, one of said members being dished to form a chamber for enclosing the gearing and winding drum of said mechanism and a portion of the brake chain which winds on said drum, the said dished portion being closed at the top and sides but open at the bottom and the lower portion of the front wall of the housing being flared outwardly from a location near the horizontal center of the winding drum to the lower edge of the housing.

5. A housing for hand brake winding mechanism comprising back and front members, one of said members being dished to form a chamber for enclosing the gearing and winding drum of said mechanism and a portion of the brake chain which winds upon said drum, the said dished portion of the housing being open at one end and having side walls which are curved laterally to conform generally with the shape of the drum gear, and the front wall of the housing being flared outwardly from a location near the horizontal center of that portion of the housing defined by the said curved side wall, whereby the lower edge portion of the front wall provides an angular rigidifying portion which extends across the housing from side to side thereof.

6. A hand brake mechanism for railway cars including a winding drum adapted to be arranged in a vertical position on a car, a vertically disposed hand wheel for revolving the drum, a rocking member pivoted on the lower portion of the car and adapted to swing in a plane transverse to the plane of said winding drum, and a flexible connector for connecting the drum with said rocking member; a housing for enclosing the winding drum and the upper portion of said connector comprising back and front members, one of which is dished to provide a winding drum chamber open at one end, the lower portion of the front wall being flared outwardly relative to the plane of the upper portion thereof to accommodate the outward swinging movement of said connector during the operation of said rocking member.

7. In hand brake mechanism for railway cars including a winding drum, a take-up chain adapted to be wound thereon, a ratchet wheel rotatable with said drum, a holding pawl provided with a shaft, a housing comprising back and front members having oppositely disposed bearing openings in which said pawl shaft is pivotally supported, means for tripping the pawl and for re-engaging it with the ratchet, and means mounted on a wall of the housing adjacent the bearing opening therein to increase the width of the bearing surface of said opening at the location which receives the thrusts and pressures from said pawl.

8. In hand brake mechanism for railway cars including a winding drum, a take-up chain adapted to be wound thereon, a ratchet rotatable with said drum, a holding pawl provided with a shaft, a housing comprising back and front members having oppositely disposed bearing openings in which said pawl shaft is pivotally supported, means for disengaging the pawl from the ratchet, and for permitting its re-engagement therewith, and a reinforcing plate on the front wall of the housing having an opening for the shaft slightly larger than the bearing opening in said wall and eccentrically arranged to align with said bearing openings at a point to take the thrust of the pawl when the latter is re-engaged with the ratchet.

9. In hand brake mechanism for railway cars, a housing comprising a back plate and an outwardly dished front member which together enclose the operating parts of said mechanism including a large drum gear, bearing members fixed to the inner faces of the back and front walls of the housing for supporting the operating parts of said mechanism, attaching flanges on the front member adapted to be secured to the marginal portion of the back plate and provided with holes for receiving mounting rivets for attaching the upper end of the housing to the car, there being also a pair of mounting rivet holes in the back plate which are overlapped by the said drum gear, and the said drum gear and the front wall of the housing being provided with openings adapted to receive an implement for upsetting the ends of the last mentioned rivets when applying the housing to the car.

10. A housing for hand brake winding mechanism comprising a back plate and an outwardly dished front member which together enclose and support in a vertical position on a car the gearing and winding drum of said mechanism and the upper portion of a brake chain, the said housing being closed at the top and sides but open at the bottom and the lower portion of the front wall at one side only of the housing being flared outwardly to provide clearance for said chain.

RICHARD W. BURNETT.